United States Patent

Dann

[15] 3,689,506
[45] Sept. 5, 1972

[54] BENZOFURAN DIAMIDINE COMPOUNDS

[72] Inventor: Otto Dann, c/o Farbrverke Hoechst AG., Frankfurt am Main, Germany

[22] Filed: April 27, 1970

[21] Appl. No.: 43,263

Related U.S. Application Data

[62] Division of Ser. No. 731,287, May 22, 9168, Pat. No. 3,652,591.

[30] Foreign Application Priority Data

May 26, 1967 Germany ................. D 53173

[52] U.S. Cl. ........................... 260/346.2 R, 424/285
[51] Int. Cl. ............................................. C07d 5/42
[58] Field of Search .......................... 260/346.2 R

[56] References Cited

FOREIGN PATENTS OR APPLICATIONS 1,502,346    1967    France

*Primary Examiner*—Alex Mazel
*Assistant Examiner*—Bernard Dentz
*Attorney*—Curtis, Morris & Safford

[57] ABSTRACT

New diamidine compounds having trypanocidal action and corresponding to the general formula

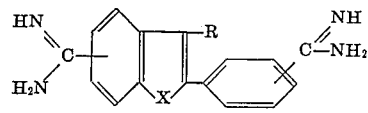

in which R represents hydrogen or lower alkyl, and X represents oxygen, —NH— or —$CH_2$— and salts of these compounds with inorganic or organic acids.

4 Claims, No Drawings

BENZOFURAN DIAMIDINE COMPOUNDS

This application is a division of application Ser. No. 731,287 filed May 22, 1968 now U.S. Pat. No. 3,652,591.

The present invention relates to new diamidine compounds and to a process for preparing them.

More especially, the present invention provides new diamidine compounds of the general formula I

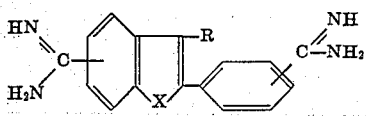

in which R represents hydrogen or lower alkyl, and X represents oxygen, —NH— or —CH$_2$—, and salts of these compounds with inorganic or organic acids.

The present invention also provides a process for preparing the new diamidine compounds, wherein a dicyano compound of the general formula II

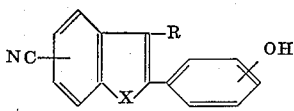

in which R and X have the meanings given above, is converted by means of dry hydrogen halide in an anhydrous solvent in the presence of an alkanol of the general formula Alk OH, in which ALk represents lower alkyl, into a diimino either of the general formula III

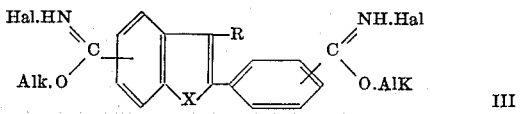

in which R and X have the meanings given above, and in which Alk stands for low molecular weight alkyl and Hal stands for halogen, and the diimino ether is reacted with dry ammonia gas in an anhydrous solvent.

The diamidine compounds prepared according to the invention are distinguished by a strong trypanocidal action which is directed against trypanosomes that are pathogenic to humans, for example *Trypanosoma rhodesiense* and *Trypanosoma gambiense*, as well as against trypanosomes that are pathogenic to animals, for example *Trypanosoma congolense*.

The action of the new diamidine compounds against trypanosomes was compared with the action of (carbonyl-bis-{8-[3-(3-amino-benzamido)-4-methyl-benzamido]-naphthalene-trisulfonic acid-(1,3,5)}) and [4,4'-diamidino-diphenoxypentane-bis-(β-hydroxyethane-sulfonate)] by experiments on infected mice. The results of these experiments are shown in the following Table 1.

A = 5-amidino-2-(4'-amidino-phenyl)-indol-dihydrochloride
B = 6-amidino-2-(4'-amidino-phenyl)-indene-dihydrochloride
C = 5-amidino-2-(4'-amidino-phenyl)-benzofurane-dihydrochloride
D = 5-amidino-3-methyl-2-(4'-amidino-phenyl)-benzofuranedihydrochloride
E = [4,4'-diamidino-diphenoxy-pentane-bis-(β-hydroxyethanesulfonate)]
F = (carbonyl-bis-{8-[3-(3-amino-benzamido)-4-methyl-benzamido]-naphthalene-trisulfonic acid-(1,3,5)}).

TABLE 1

| Substance | mg/kg | Number of mice treated | Number of surviving mice after 6 weeks |
|---|---|---|---|
| A | 1 (subcutaneously) | 6 | 6 |
|  | 0.5 (subcutaneously) | 6 | 6 |
|  | 0.25 (subcutaneously) | 6 | 4 |
|  | 100 (perorally) | 6 | 6 |
|  | Infection control | 12 | 0 |
| B | 2 (subcutaneously) | 6 | 6 |
|  | 1 (subcutaneously) | 6 | 6 |
|  | 0.5 (subcutaneously) | 6 | 6 |
| B | 64 (perorally) | 6 | 6 |
|  | 16 (perorally) | 6 | 5 |
|  | Infection control | 12 | 0 |
| C | 2 (subcutaneously) | 6 | 6 |
|  | 1 (subcutaneously) | 6 | 6 |
|  | 0.5 (subcutaneously) | 6 | 6 |
|  | 64 (perorally) | 6 | 6 |
|  | 16 (perorally) | 6 | 5 |
|  | Infection control | 12 | 0 |
| D | 1 (subcutaneously) | 16 | 16 |
|  | 0.5 (subcutaneously | 16 | 16 |
|  | 0.25 (subcutaneously) | 16 | 10 |
|  | 100 (perorally) | 6 | 6 |
|  | 10 (perorally) | 6 | 3 |
|  | Infection control | 32 | 0 |
| E | 2 (subcutaneously) | 6 | 6 |
|  | 1 (subcutaneously) | 6 | 6 |
|  | 0.5 (subcutaneously) | 6 | 2 |
|  | Infection control | 12 | 0 |
| F | 2 (subcutaneously) | 6 | 5 |
|  | 1 (subcutaneously) | 6 | 3 |
|  | Infection control | 12 | 0 |

As is evident from the above Table, the compounds of the present invention have a stronger trypanocidal action than the two known trypanocidal compounds.

The new compounds also show a good action when administered perorally. In contradistinction thereto, the known compounds and the 6-amidino-2-(4'-amidino-phenyl)-thionaphthene described in German Pat. No. 1 234 228 show no action when administered perorally.

The action of the compound 6-amidino-2-(4'-amidino-phenyl)-indol-dihydrochloride prepared according to the present invention against the strain *Trypanosoma congolense which is pathogenic to animals was compared in experiments with that of the compound* 4,4'-diamidino-aminobenzene.

Mice were treated subcutaneously 2 hours after infection by 6-amidino-2-(4'-amidino-phenyl)-indol-dihydrochloride and with 4,4'-diamidino-diazoaminobenzene, respectively. The animals were observed for 9 weeks after the infection. The results are compiled in the following Table 2.

Strain: *Trypanosoma congolense*
Substance A = 6-amidino-2-(4'-amidino-phenyl)-indol-dihydrochloride
Substance B = 4,4'-diamidino-diazoaminobenzene

TABLE 2

| Substance | mg/kg, subcutaneously | Number of mice treated | number of surviving mice after 9 weeks |
|---|---|---|---|

| | | | |
|---|---|---|---|
| A | 20 | 10 | 10 |
| | 9 | 10 | 10 |
| | 7 | 10 | 10 |
| | 6 | 10 | 10 |
| | 4,5 | 10 | 9 |
| B | 10 | 10 | 10 |
| | 9 | 10 | 7 |
| | 7 | 10 | 8 |
| | 6 | 10 | 8 |
| | 4,5 | 10 | 4 |

The data compiled in the above Table show that 6-amidino-2-(4'-amidino-phenyl)-indol-dihydrochloride has a stronger trypanocidal action than 4,4'-diamidino-diazoaminobenzene. The compounds [4,4'-diamidino-diphenoxypentane-bis-(β-hydroxy-ethanesulfonate)], (carbonyl-bis-{8-[3-(3-amino-benzamino)-4-methyl-benzamino]-naphthalene-trisulfonic acid-(1,3,5)}) and the 6-amidino-2-(4'-amidino-phenyl)-thionaphthene described in the German Pat. No. 1 234 228 practically have no action against *Trypanosoma congolense*.

For therapeutic use, the acid addition salts with non toxic acids, for example with hydrochloric acid, phosphoric acid, acetic acid, tartaric acid, citric acid, succinic acid, lactic acid, maleic acid and isothionic acid, may be used.

The dinitrile compounds required as the starting substances may be obtained according to known methods.

The following Examples illustrate the invention but they are not intended to limit it thereto:

EXAMPLE 1:

5-Amidino-2-(4'-amidino-phenyl)-benzofurane-dihydrochloride

A solution of 2 g (0.0082 mol) of 5-cyano-2-(4'-cyanophenyl)-benzofurane in 200 ml of anhydrous chloroform was combined with 10 ml (0.18 mol) of absolute ethanol. Then, dry HCl gas was introduced for 3 hours into the solution which after saturation with hydrogen chloride, was poured into a pressure bottle and shaken for 8 days. The precipitate that had formed was separated by filtration with suction and washed with dry ether and petroleum ether. After drying under reduced pressure over phosphorous pentoxide and potassium hydroxide, 3.3 g (98.5 percent of the theoretical yield) of the faintly yellow hydrochloric diimino-ether were obtained.

200 ml of absolute ethanol were saturated with dry ammonia gas and then combined with the dried diimino-ether. The reaction mixture was shaken for 8 days and the precipitate that formed was filtered off with suction. The yellow salt was dried over phosphorus pentoxide and potassium hydroxide at 20° C. For removing any still adhering hydrogen chloride gas and water, the salt was dried for 24 hours under reduced pressure at 90° C over phosphorus pentoxide and potassium hydroxide.

2.28 g (79 percent of the theoretical yield) of yellow colored 5-amidino-2-(4'-amidino-phenyl)-benzofurane-dihydrochloride melting at 355° — 358° C (decomposition) were obtained.

The 5-amidino-2-(4'-amidino-phenyl)-benzofurane-diisoethionate was found to melt at 285° — 289°C. It dissolved at room temperature in water to give a 15 percent solution.

The 5-amidino-2-(4'-amidino-phenyl)-benzofurane-dilactate was found to melt at 287° — 289° C with decomposition. It dissolved at room temperature in water to give a 0.45 percent solution.

The starting products prepared according to known methods had the following melting points:

5-bromo-2-(4'-nitro-phenyl)-benzofurane: 198° — 200° C 5-bromo-2-(4'-amino-phenyl)-benzofurane: 204° — 205° C 5-bromo-2-(4'-bromo-phenyl)-benzofurane: 193° − 195° C 5-cyano-2-(4'-cyano-phenyl)-benzofurane: 241° − 243° C

EXAMPLE 2:

5-Amidino-3-methyl-2-(4'-amidino-phenyl)-benzofurane-di-hydrochloride

A solution of 1.55 g (0.006 mol) of 5-cyano-3-methyl-2-(4'-cyano-phenyl)-benzofurane in 100 ml of dry chloroform was combined with 8 ml (0.142 mol) of absolute ethanol. Then, dry HCl gas was introduced for 2 hours into the solution. The solution that had saturated with hydrogen chloride was introduced into a pressure bottle and shaken for 6 days. The precipitate that formed was transfered with the reaction mixture into a round flask and the solvent was removed with precaution under reduced pressure in a rotatory evaporator. The imino-ethyl-ether hydrochloride that formed was immediately subjected to further treatment.

The imino-ethyl ether hydrochloride was combined with 120 ml of absolute ethanol saturated with ammonia and the reaction mixture was shaken in a pressure bottle for a week. The yellow precipitate that formed was filtered under suction, washed with 2N-hydrochloric acid, and dried in vacuum at 20°C. over phosphorus pentoxide and potassium hydroxide. Drying over these agents was continued for 24 hours at 90°C. to remove any hydrogen chloride and water still present.

2.0 g (91.3 percent of the theoretical yield) of yellow 5-amidino-3-methyl-2-(4'-amidinophenyl)-benzofuran-dihydrochloride were obtained. m.p. 360° — 365°C. (with decomposition).

The starting materials, obtained according to known methods, had the following melting points:

5-bromo-3-methyl-2-(4'-nitrophenyl)-benzofuran: 188° — 190° C.;

5-bromo-3-methyl-2-(4'-aminophenyl)-benzofuran: 110° — 111°C.;

5-bromo-3-methyl-2-(4'-bromophenyl)-benzofuran: 146° — 148° C.;

5-cyano-3-methyl-2-(4'-cyanophenyl)-benzofuran: 257° — 258° C.

EXAMPLE 3

6-Amidino-2-(4'-amidinophenyl)-benzofuran-dihydrochloride

A solution of 2 g (0.0082 mol) of 6-cyano-2-(4'-cyanophenyl)-benzofuran in 100 ml of dry chloroform was combined with 10 ml (0.18 mol) of absolute alcohol in a pressure bottle. Dry HCl gas was then introduced into the solution for 3 hours. The solution, saturated with hydrogen chloride, was shaken for 6 days. The precipitate formed was then suction-filtered and washed with dry ether and petroleum ether. The weakly yellow colored imino-ethyl-ether hydrochloride was immediately subjected to further treatment.

The imino-ethyl-ether hydrochloride, still damp with solvent, was combined with 160 ml of absolute ethanol saturated with ammonia and the reaction mixture was shaken in a pressure bottle for 6 days. The weakly yellow precipitate that had formed was filtered off and the solvent was removed by distillation in a rotary evaporator. The yellow precipitate was made into a paste with 30 ml of 2N hydrochloric acid and the salt formed was filtered off. The salt was dried for 24 hours over phosphorus pentoxide and potassium hydroxide under reduced pressure at 20° C and for 24 hours under reduced pressure at 90° C.

2.1 g (72.8 percent of the theoretical yield) of yellow 6-amidino-2-(4'-amidino-phenyl)-benzofurane-dihydrochloride were obtained. The compound was found to start sintering at 230° C and to melt at 265° C. It decomposed upon further heating to above 370° C.

The starting substances obtained according to known methods had the following melting points:

6-bromo-2-(4'-nitrophenyl)-benzofurane: 222-224° C 6-bromo-2-(4'-acetamino-phenyl)-benzofurane: 203° – 205° C 6-bromo-2-(4'-bromo-phenyl)-benzofurane: 122° – 124° C 6-cyano-2-(4'-cyano-phenyl)-benzofurane: 221° – 223° C

EXAMPLE 4:

6-Amidino-2-(4'-amidino-phenyl)-indol-dihydrochloride 10 g of 6-cyano-2-(4'-cyano-phenyl)-indol were dissolved in 230 ml of glycol-monomethyl ether by heating. Dry HCl gas was introduced until saturation into the cooled solution with exclusion of moisture, while cooling in a water bath. The HCl-saturated solution was poured into a dry pressure bottle, the stopper was fastened and the bottle was shaken mechanically for 3 days. The suspension that had formed was diluted with 100 — 150 ml of methanol and centrifuged for 30 minutes. After decanting of the solvent, the precipitate was stirred several times with anhydrous petroleum ether, decanted again and finally filtered off with suction. The magna-like imino-ether hydrochloride which was still wet from petroleum ether was transferred into a bottle having a capacity of 1 liter, combined with 400 ml of absolute alcohol saturated with ammonia and shaken mechanically for 7 days. The diamidine that precipitated was filtered off with suction and stirred vigourously for about half an hour in a beaker with about 800 ml of 2N HCl. The diamidine-dihydrochloride that formed was again filtered off with suction and dried in a vacuum desiccator at first for 2 days over KOH, then for a further 2 — 3 days over potassium hydroxide and phosphorus pentoxide, until complete dryness.

Yield: 12 g (83.5 percent of the theoretical yield) of yellow 6-amidino-2-(4'-amidino-phenyl)-indol-dihydrochloride melting at 360° — 362° C with decomposition.

EXAMPLE 5:

6-Amidino-2-(4'-amidino-phenyl)-indol-dilactate 250 g of the ion exchanger "Merck III, strongly basic" were filled into a column having a diameter of about 6 cm and a length of 35 cm, and saturated with about 800 ml of 20 percent ammonium lactate solution.

A solution, prepared at room temperature, of 10 g of 6-amidino-2-(4'-amidinophenyl)-indol dihydrochloride in about 1 liter of water was passed through this exchange column. The column was washed with about 500 ml of water until the eluate was colorless. The combined eluates were evaporated to dryness in a rotary evaporator under reduced pressure at 30° – 40° C. The residue was dried in the flask for 2 to 3 days in a vacuum desiccator over phosphorus pentoxide and triturated to a yellow powder. Yield: 13 g (100 percent of the theoretical yield) of yellow dilactate which was found to melt at 219° — 222° C. The solubility in water at 20° C was 60 percent. The aqueous solution showed a neutral reaction.

The diacetate had a melting point of 250° – 253° C (decomposition). The solubility in water at 20° C was 6.5 percent. The aqueous solution showed a neutral reaction.

EXAMPLE 6:

5-Amidino-2-(4'-amidino-phenyl)-indol-dihydrochloride 4 g of 5-cyano-2-(4'-cyano-phenyl)-indol were dissolved in 250 ml of nitrobenzene by heating. The solution was cooled in a water bath, whereby the substance precipitated partly. 50 ml of absolute alcohol were added to the suspension and then dry HCl-gas was introduced until saturation under exclusion of moisture, while cooling in a water bath. The HCl-saturated solution was poured into a pressure bottle and shaken mechanically for 12 days. The imino-ether hydrochloride that separated was filtered off with suction, washed with anhydrous ether and anhydrous petroleum ether until it was largely free from HCl and transferred into a pressure bottle. 200 ml of absolute alcohol saturated with ammonia were added and the reaction mixture was shaken for 7 days. The diamidine that separated was filtered off with suction and stirred vigorously for about half an hour with 300 — 400 ml of 2N HCl. The diamidine-dihydrochloride that formed was filtered off with suction and dried in a vacuum desiccator for 1 — 2 days over potassium hydroxide, then for a further 2 — 3 days over potassium hydroxide and phosphorus pentoxide until complete dryness. 3.1 g (= 54 percent of the theoretical yield) of 5-amidino-2-(4'-amidino-phenyl)-indol-dihydrochloride melting at 360° – 364° C with decomposition were obtained.

EXAMPLE 7:

6-Amidino-2-(3'-amidino-phenyl)-indol-dihydrochloride 1.45 g of 6-cyano-2-(3'-cyano-phenyl)-indol were dissolved in 45 ml of nitrobenzene by heating. The cooled solution was combined with 18 ml of absolute alcohol and then dry HCl gas was introduced until saturation under exclusion of moisture, while cooling in a water bath. The solution saturated with hydrogen chloride was introduced into a pressure bottle and shaken mechanically for 5 days. The imino-ether hydrochloride that precipitated was filtered off with suction, washed on the filter with anhydrous ether and anhydrous petroleum ether until it was largely free from HCl and poured into a pressure bottle. After addition of 80 ml of absolute alcohol saturated with ammonia, the whole was shaken mechanically for 7 days. The diamidine that precipitated was filtered off with suction and stirred vigorously for about half an hour with about 150 ml of 2N HCl. The diamidine-dihydrochloride that formed was filtered off with suction and dried in a vacuum desiccator for 1 — 2 days over potassium hydroxide, then for a further 1 — 2 days over potassium hydroxide and phosphorus pentoxide until complete dryness. 1.1 g (= 53 percent of the theoretical yield) of 6-amidino-2-(3'-amidino-phenyl)-indol-dihydrochloride melting at 331° — 333° C with decomposition was obtained.

EXAMPLE 8:

5-Amidino-2-(3'-amidino-phenyl)-indol-dihydrochloride 1.7 g of 5-cyano-2-(3'-cyano-phenyl)-indol were dissolved in 90 ml of nitrobenzene while heating. The solution was cooled on a water bath, whereby the substance precipitated partly. The suspension was combined with 22 ml of absolute alcohol and then dry HCl gas was introduced until saturation under exclusion of moisture, while cooling in a water bath. The HCl-saturated solution was poured into a pressure bottle and shaken mechanically for 7 days. The imino-ether hydrochloride that precipitated was filtered off with suction, washed with anhydrous ether and anhydrous petroleum ether until it was largely free from HCl and transferred into a dry pressure bottle. Then, 100 ml of absolute alcohol saturated with ammonia were added and the whole was shaken mechanically for 7 days. The diamidine that precipitated was filtered off with suction and stirred vigorously for about half an hour with 150 — 200 ml of 2N HCl. The diamidine-dihydrochloride that formed was filtered off with suction and dried in a vacuum desiccator for 1 — 2 days over potassium hydroxide, then for a further 2 — 3 days over potassium hydroxide and phosphorus pentoxide until complete dryness.

1.5 g (61 percent of the theoretical yield) of 5-amidino-2-(3'-amidino-phenyl)-indol-dihydrochloride, melting at 290 - 298° C with decomposition, were obtained.

The starting products prepared according to known methods had the following melting points:
6-bromo-2-(4'-bromo-phenyl)-indol: 193° — 194° C
5-bromo-2-(4'-bromo-phenyl)-indol: 204° — 206° C
6-bromo-2-(3'-bromo-phenyl)-indol: 123° — 125° C
5-bromo-2-(3'-bromo-phenyl)-indol: 147° — 148° C
6-cyano-2-(4'-cyano-phenyl)-indol: 283° — 284° C
5-cyano-2-(4'-cyano-phenyl)-indol: 309° — 310° C
6-cyano-2-(3'-cyano-phenyl)-indol: 230° — 232° C
5-cyano-2-(3'-cyano-phenyl)-indol: 256° — 258° C

EXAMPLE 9:

6-Amidino-2-(4'-amidino-phenyl)-indene-dihydrochloride

Dry hydrogen chloride gas was introduced until saturation into a solution of 4.5 g (19 mmols) of 6-cyano-2-(4'-cyano-phenyl)-indene, melting at 239° — 241° C, in 250 ml of anhydrous chloroform and 250 ml of ethanol. The solution was then poured into a pressure bottle and stirred mechanically for 12 days. The precipitate was washed twice with anhydrous ether and twice with petroleum ether.

The diamino-ether-dihydrochloride was immediately combined in a pressure bottle with 300 ml of absolute ethanol saturated with ammonia and the air in the bottle was replaced by nitrogen. The bottle was shaken mechanically for one week. The precipitate that separated was filtered off, made into a paste with 250 ml of 2N hydrochloric acid, again filtered off and washed with binormal hydrochloric acid. The still wet diamidine-dihydrochloride was dissolved in about 250 ml of water while stirring. The slightly turbid solution was filtered and the diamidine-dihydrochloride was precipitated from the clear solution by adding 250 ml of 2N hydrochloric acid while stirring. The yellow product that had precipitated was filtered off and dried under reduced pressure for 48 hours over potassium hydroxide. 4.5 g (68 percent of the theoretical yield) of 6-amidino-2-(4'-amidino-phenyl)-benzofurane-dihydrochloride which, upon heating, turned dark from about 250° C on, and which carbonized while melting when heated to 360° C., were obtained.

EXAMPLE 10:

In a manner analogous to that described in Example 9, 3-methyl-6-amidino-2-(4'-amidinophenyl)-indene-dihydrochloride was obtained in a yield of 70 percent from 3-methyl-6-cyano-2-(4'-cyano-phenyl)-indene (melting point 226° — 228° C). The 3-methyl-6-amidino-2-(4'-amidino-phenyl)-indene-dihydrochloride had a yellow color and, when heated, it turned dark from about 250° C on and carbonized with melting when heated to 360° C.

EXAMPLE 11:

In a manner analogous to that described in Example 9, 3-ethyl-6-amidino-2-(4'-amidinophenyl)-indene hydrochloride was obtained in a 40 percent yield from 3-ethyl-6-cyano-2-(4'-cyanophenyl)-indene (m.p. 188° - 190° C.). The 3-ethyl-6-amidino-2-(4'-amidino-phenyl)-indene-dihydrochloride had a yellow color. When heated it turned dark from about 250°C on and carbonized with melting when heated to 360° C.

EXAMPLE 12:

In a manner analogous to that described in Example 9, 3-n-propyl 6-amidino-2-(4'-amidino-phenyl)-indene-dihydrochloride was prepared in a yield of 65 percent from 3-n-propyl-6-cyano-2-(4'-cyanophenyl)-indene (m.p. 155° – 157° C.). The 3-n-propyl-6-amidino-2-(4'-amidino-phenyl)-indene-dihydrochloride had a yellow color and, when heated, it turned dark from about 250° C on and melted at about 345° C. The starting substances required for preparing the above compounds were obtained according to known methods.

We claim:
1. A diamidine compound of the formula

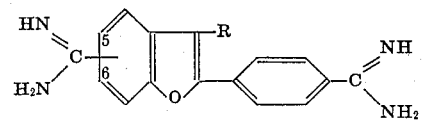

wherein the amidino group is in the five-position or six-position in the benzofuran ring and R is alkyl having one to three carbon atoms, and pharmaceutically acceptable acid addition salts thereof.

2. 5-amidino-2-(4-amidinophenyl)-benzofurane and pharmaceutically acceptable acid addition salts thereof.

3. 5-amidino-3-methyl-2-(4'-amidinophenyl)-benzofurane and pharmaceutically acceptable acid addition salts thereof.

4. 6-amidino-2-(4'-amidinophenyl)-benzofurane and pharmaceutically acceptable acid addition salts thereof.

* * * * *